United States Patent [19]

Stark

[11] Patent Number: 5,882,453
[45] Date of Patent: Mar. 16, 1999

[54] METHOD OF FORMING A STABILIZED CONTAINED FACILITY LINER

[75] Inventor: Timothy D. Stark, Urbana, Ill.

[73] Assignee: Geosynthetics, Inc., Miami, Fla.

[21] Appl. No.: 835,453

[22] Filed: Apr. 8, 1997

Related U.S. Application Data

[60] Division of Ser. No. 520,803, Aug. 30, 1995, Pat. No. 5,662,983, which is a continuation-in-part of Ser. No. 299,778, Sep. 1, 1994, Pat. No. 5,501,753.

[51] Int. Cl.$^6$ .......................... B32B 03/12; B32B 27/14; B32B 31/14; E02D 17/20
[52] U.S. Cl. .......................... 156/70; 52/169.14; 156/71; 156/292; 210/170; 405/229
[58] Field of Search .................... 52/169.14; 156/71, 156/70, 292, 145; 210/170; 405/229, 109, 38, 115, 270; 428/117

[56] References Cited

U.S. PATENT DOCUMENTS

| | | | |
|---|---|---|---|
| 1,378,498 | 5/1921 | Tomac . | |
| 3,186,896 | 6/1965 | Clem ................................... | 428/117 X |
| 3,249,659 | 5/1966 | Voelker ............................... | 428/117 X |
| 3,445,332 | 5/1969 | Saiia et al. ........................... | 428/117 X |

(List continued on next page.)

OTHER PUBLICATIONS

Askari et al., "Synthesis and Characterization of Acrylic-Based Superabsorbents", J. Appl. Poly. Sci., vol. 50, pp. 1851–1855 (1993).
Daniel, "Geosynthetic Clay Liners", Geotechnical News, vol. 9, No. 4, Dec. 1991, pp. 28–32.
Carson, "A Brief Summary of U.S. EPA Subtitle D Munciple Waste Regulations", Geotechnical News, vol. 11, No. 3, pp. 36–38 (1993).
Bentofix™ Geosynthetic Clay Liners—Sales brochure from National Seal Co.
Bentomat® Geosynthetic Clay Liner—Sales brochure from Colloid Environmental Technologies Co.
Tensar Geogrids in Civil Engineering—Sales brochure from Tensar Corp.
Koerner, Designing With Geosynthetics, 3rd Ed., (Prentice Hall, 1994), pp. 6–7, 52–55 and 624–655.
1987 ASTM ( America Society fot Testing and Materials) Annual Book of Standards, vol. 4.08, D–4439–85, 1985, "Geotextiles".

*Primary Examiner*—Francis J. Lorin
*Attorney, Agent, or Firm*—Pennie & Edmonds LLP

[57] ABSTRACT

The invention relates to a stabilized fluid barrier member and to methods of forming the same. The fluid barrier comprises a first outer sheet member having a top surface and a bottom surface, with a stabilizer element overlying at least part of the first sheet member top surface and abutting the top surface along at least a portion thereof. The stabilizer element contains a plurality of interstitial apertures adapted to contain a quantity of a selectively fluid-impervient barrier material and for substantially preventing displacement of the barrier material from the apertures, notwithstanding the angular inclination at which the fluid barrier member is oriented during manufacture, transport, installation and/or use. The barrier material is chosen for its ability to prevent passage of one or more particular fluids, in liquid or gas form, depending upon the application for which the barrier member is intended. The fluid barrier member of the invention may further comprise an optional second outer sheet member also having a top surface and a bottom surface. The second sheet member, when included, overlays at least part of the stabilizer element such that at least a portion of the second sheet member bottom surface abuts the stabilizer element. After positioning the various components of the barrier member in abutting stacked relation, they may all be bonded together along at least a portion of their abutting surfaces to form an interconnected laminate wherein the stabilizer element is in contact with and bonded to both the first and the second outer sheet members.

22 Claims, 6 Drawing Sheets

U.S. PATENT DOCUMENTS

| | | | |
|---|---|---|---|
| 3,561,177 | 2/1971 | Agro et al. | 428/117 X |
| 3,986,365 | 10/1976 | Hughes | 61/36 C |
| 4,003,208 | 1/1977 | Hornung et al. | 61/45 D |
| 4,074,948 | 2/1978 | Heater, Jr. | 404/75 |
| 4,168,924 | 9/1979 | Draper et al. | 404/70 |
| 4,302,495 | 11/1981 | Marra | 428/110 |
| 4,417,828 | 11/1983 | De Winter | 405/17 |
| 4,467,015 | 8/1984 | Clem | 428/454 |
| 4,501,420 | 2/1985 | Dury | 272/3 |
| 4,501,788 | 2/1985 | Clem | 428/240 |
| 4,565,468 | 1/1986 | Crawford | 405/270 |
| 4,572,700 | 2/1986 | Mantarro et al. | 404/35 |
| 4,574,100 | 3/1986 | Mercer | 428/134 |
| 4,581,864 | 4/1986 | Shvakhman et al. | 52/169.14 |
| 4,597,693 | 7/1986 | McQuary et al. | 405/176 |
| 4,629,358 | 12/1986 | Springston et al. | 404/35 |
| 4,662,778 | 5/1987 | Dempsey | 404/35 |
| 4,804,293 | 2/1989 | Varkonyi et al. | 405/15 |
| 4,896,993 | 1/1990 | Bohnhoff | 404/33 |
| 4,927,297 | 5/1990 | Simpson | 405/270 |
| 4,997,695 | 3/1991 | Clem | 428/76 |
| 4,997,701 | 3/1991 | Clem | 428/241 |
| 5,043,076 | 8/1991 | Alexander | 210/679 |
| 5,053,264 | 10/1991 | Beretta | 428/131 |
| 5,082,397 | 1/1992 | Raviv | 405/176 |
| 5,091,247 | 2/1992 | Willibey et al. | 428/255 |
| 5,096,335 | 3/1992 | Anderson et al. | 405/288 |
| 5,132,021 | 7/1992 | Alexander | 210/679 |
| 5,174,231 | 12/1992 | White | 112/420 |
| 5,199,825 | 4/1993 | Travis | 405/296 |
| 5,237,945 | 8/1993 | White | 112/420 |
| 5,258,217 | 11/1993 | Lewis | 428/120 |
| 5,273,804 | 12/1993 | Brian et al. | 428/138 |
| 5,273,814 | 12/1993 | Kelly | 428/244 |
| 5,277,520 | 1/1994 | Travis | 405/128 |
| 5,346,565 | 9/1994 | White | 156/71 |
| 5,346,566 | 9/1994 | White | 156/71 |
| 5,360,294 | 11/1994 | Carriker et al. | 405/270 |
| 5,401,552 | 3/1995 | Bohrer et al. | 428/87 |

METHOD OF FORMING A STABILIZED CONTAINED FACILITY LINER

CROSS-REFERENCE TO RELATED APPLICATION

This application is a divisional of presently pending application Ser. No. 08/520,803 filed Aug. 30, 1995 which, in turn, was a continuation-in-part of application Ser. No. 08/299,778 filed Sep. 1, 1994, which issued Mar. 26, 1996 as U.S. Pat. No. 5,501,753.

TECHNICAL FIELD

The invention generally relates to an internally stabilized fluid barrier member adapted for installation at any desired angular inclination without substantial shifting of one or more selectively fluid-impervient materials contained therein. In a preferred embodiment the invention relates to a geosynthetic clay liner for use, e.g., in waste containment facilities containing hazardous and/or municipal solid waste, for preventing leachate therefrom from leaving the facility and passing into adjacent groundwater systems.

BACKGROUND OF THE INVENTION

As described herein, the fluid barrier of the invention is adaptable for use in a variety of applications to prevent passage of selected "fluids", defined herein to include both liquids and gasses, between a first location and a second location a distance removed therefrom by interposing the barrier therebetween. One preferred use for the barrier member of the invention is as a geosynthetic clay liner for use in isolating leachate from a waste containment facility, e.g., a landfill, from adjacent groundwater systems. The applicability of the invention is not, however, limited solely to use in waste containment facilities. Rather, the presently described fluid barrier member is useful in any situation where it is desirable to selectively hinder or prevent the flow of one or more fluids from a first location to a second location a distance removed therefrom, particularly wherein the intervening surface between the first and second locations is sloped or otherwise uneven. Such applications include, but are not limited to stabilizing the subsurface soil supporting a roadway or a railroad track, constructing a water retaining structure such as an earthen dam or a canal, containing leakage from a pipeline, liquid containment facility, or storage tank, minimizing leakage into underground structures such as tunnels, mines, or retaining structures, insulating structures from hot or cold weather or subsurface water attributable to the ground-water table or capillary migration, and isolating the subterranean portion of buildings likely to be affected by seismic forces. For convenience in explaining the invention however, it will be mainly described herein with relation to its use as a waste containment facility liner or cover system with the understanding that such use is not limiting.

Waste containment facilities, such as landfills, are ordinarily provided with a low hydraulic conductivity barrier and drainage system comprising a liner formed of compacted clay or a layer of water swellable clay overlain by one or more sheets of geosynthetic material, e.g., a geomembrane and a geotextile. Such liners are typically installed to isolate the leachate produced by the waste containment facility from adjacent groundwater systems. In addition, these facilities are also required to be covered with a low hydraulic conductivity barrier and drainage system upon closure. In the United States liners and covers are, in fact, required for use in all hazardous waste and new or expanded municipal solid waste containment facilities under subtitles C and D of the Federal Resource and Conservation Recovery Act (1976).

The static and dynamic (e.g., seismic activity) stability of such liner and cover systems is controlled by their shear strength, as measured at the component mid-plane or interfaces. Liner stability is of critical importance for preventing liner failure and release of leachate, particularly when the topographical surface of the waste containment facility site is not substantially level, i.e., wherein the surface of the facility slopes at a relatively substantial angle, i.e., of greater than about 9–10 degrees. Cover stability is also of critical importance for preventing a slope stability failure that may endanger people or property and allow precipitation to infiltrate the waste.

In the earliest prior art, waste containment facility liners were formed by applying several feet of barrier material, such as natural soil or a mixture of natural soil and bentonite, directly to the soil surface of the facility. The barrier material was thereafter impacted into place and covered by a layer of soil. Thereafter however, a composite liner was developed. These articles comprise a compacted clay liner overlain by a geomembrane. This dual component liner system was found to be useful for providing multiple protection against leakage of leachate from waste containment facilities.

There are several major problems associated with the placement and use of the compacted clay liners described above. These include the difficulty and expense of locating and transporting a suitable type and quantity of "borrow material", i.e., a term used in the art to describe soil which is used to construct the compacted clay layer in forming the liquid barrier; desiccation cracking in arid climates, freeze-ethaw cracking in cold climates and saturation or excessive water content in humid climates. In addition, extremely expensive field test sections and field hydraulic conductivity tests must be conducted to verify that the hydraulic conductivity is within the limits required under the applicable regulations, i.e., hydraulic conductivity less than $10^{-7}$ cm/second. The liner thus produced ranges up to about 3 feet in thickness and costs from about $3 to $10 per square foot to manufacture.

As noted above the compacted clay must, under the applicable regulations, exhibit a hydraulic conductivity of less than $10^{-7}$ cm/second. The hydraulic conductivity of the compacted clay is, however, extremely sensitive to a number of liner construction parameters, including but not limited to the compaction water content, dry unit weight, the type of compaction equipment used, compactive effort and number of compactor passes.

In general, however, increasing the compaction water content leads to a diminution in the hydraulic conductivity of the barrier, as well as the strength of the interface between the compacted clay and the geomembrane. Therefore, a compromise between minimizing the hydraulic conductivity versus maximizing the interface strength or stability is sought. This requires, however, that during its construction, the liner must be limited to a narrow range of compaction water content and dry unit weight. This range is extremely difficult and expensive to achieve and maintain. The problems associated with compacted clay liners are similar to those associated with compacted clay covers.

In an effort to overcome the drawbacks described above with compacted clay liners and covers, prefabricated geosynthetic clay liners, e.g., bentonite mats, prefabricated clay bentonite panels, clay mats, etc. ("GCLs") were developed. GCLs generally fall into two main categories. In the first category a water-swellable colloidal clay, e.g., bentonite, is sandwiched between two geotextiles (examples of such products include Bentofix® manufactured by Naue Fasertechnik/Albarrie-Naue, Ltd and distributed by National Seal Co., Aurora, Ill., Bentomat® by Colloid Environmental Technologies, Co., Arlington Heights, Ill., NaBento® manufactured by Huesker, Inc. of Charlotte, N.C. and Claymax® by the James Clem Corp., Fairmont, Ga.). In the second category of GCLs, bentonite is mixed with an adhesive and glued to a geomembrane (an example of such a product is Gundseal® produced by GSE Lining Technology, Inc., Houston Tex.). Additional GCL manufacturers include Environmental Protection Systems of Houston, Tex. and Environmental Protection, Inc. of Mancelona, Mich.

GCLs contain approximately 5 kg/ml$^2$ (1 lb./ft$^2$) of bentonite and are manufactured in panels with widths of approximately 2 to 3 meters and lengths of 25 to 60 meters. The panels are placed on rolls at the factory where they are stored until shipped to the waste containment facility site where they are unrolled and installed in their final location. Their cost is substantially lower than that of compacted clay liners, i.e., thirty to sixty cents per square foot versus $3–10 per square foot for the compacted clay liners.

Although GCLs are less expensive and easier to install (due to their reduced bulk and prefabricated construction) than the compacted clay liners, they nevertheless also exhibit significant disadvantages. As noted above, the clay used in GCLs is typically bentonite, which exhibits a hydraulic conductivity of less than $10^{-7}$ cm/sec., but only when hydrated. Unhydrated bentonite, on the other hand, exhibits a hydraulic conductivity that is greater than the required value of $10^{-7}$ cm/sec. Thus, hydration is required to maintain impermeability but leads, as discussed below, to a loss of internal and interface (e.g., between two adjacent geosynthetics) strength, rendering such products particularly susceptible to damage due to shear caused, for example, by installation upon uneven (i.e., sloped) surfaces.

Further to the above, a significant disadvantage of GCLs is their low internal strength, i.e., at the interface between the bentonite and the-geotextile or geomembrane, resulting from the hydration of the bentonite, which is of particular importance in areas prone to seismic activity. The peak and residual shear strength of hydrated bentonite correspond to a slope stability of 8 and 5 degrees, respectively. Thus, a hydrated bentonite GCL which is installed on ground having a slope greater than about 5–8 degrees will not be stable. Therefore, such prior art GCLs are susceptible to shear damage caused by sliding through, i.e., within, the internal bentonite filling. Prior art GCLs are also susceptible to shear damage caused by sliding at the top or bottom of the product because hydrated bentonite extrudes through the geotextile, causing a reduction in interface strength between adjacent geosynthetics.

Typical waste containment facility slopes range, however, from about 14 to about 26 degrees, with some proposed slopes of about 90 degrees. Thus static and seismic instability is a serious consideration in GCLs utilized in such applications once the bentonite hydrates. As a result, modifications, i.e., by the addition of one or more geomembranes emplaced above and/or below the GCL, are required to decrease and preferably prevent hydration. However, this creates additional interfaces, e.g., geomembrane/bentonite, along which shear failure can occur.

The earliest GCL products were known simply as GCLs since they consisted merely of a layer of bentonite sandwiched between two geotextiles. Subsequently, to increase the shear resistance of the bentonite, manufacturers began using vertical needle punched fibers to sew the geotextiles together in order to confine and strengthen the bentonite. This method is used in the Bentofix® and Bentomat® products marketed, respectively, by National Seal Company and Colloid Environmental Technologies Company. Another method known in the art is to stitch bond the geotextiles together. This method is used in the Claymax® and NaBento® products marketed by James Clem Corporation and Huesker, Inc., respectively. Such needle punched and stitched products are known as strengthened or improved GCLs. The vertical needle punching and stitch bonding also provides some additional shearing resistance in the middle of the GCL in an effort to prevent internal failure of the bentonite.

The strengthened construction described above suffers, however, from at least one significant drawback in that the vertical needle punching tends to tear or pull out due to small shear displacements (e.g., caused by shearing of the bentonite within the GCL), unconfined swelling of the bentonite, which may result in internal failure, (i.e., failure through the bentonite), or shear displacement along the upper or lower interface of the strengthened GCL. It has also been demonstrated that the stitching tends to act as a wick, thus increasing the permeability of the product. The shear displacement required to tear or pull out the vertical stitching is less than one inch, which can occur during use of such products in the field. Thus, strengthened GCLs provide only a minimal increase in internal strength over earlier GCLs known and used in the art. In fact, it has been demonstrated that the long-term internal strength in a strengthened GCL is approximately equal to the shear strength of bentonite alone due to the vertical stitching tearing or pulling out of the geotextiles under sustained shear stress.

For all the reasons set forth above, there has been a long felt need by those working in this field for a fluid barrier member which is stable when installed at inclinations greater than 5–8 degrees and which will not undergo internal failure upon hydration. As explained below, the stabilized fluid barrier member of the present invention meets all of these criteria.

SUMMARY OF THE INVENTION

It is therefore an object of the present invention to provide a stabilized fluid barrier member which is adapted to selectively prevent the passage of a variety of fluids from a first location, through the barrier, to a second location. A quantity of one or more selectively fluid-impermeable materials, i.e., chosen according to the particular fluid which is intended to be prevented from passage through the barrier, is contained within a stabilizer element located within the member. The stabilizer element is adapted to prevent displacement of the material(s) within the barrier member, notwithstanding the angular inclination at which the member is oriented during manufacture, transport, installation and/or use as well as to enhance bonding strength among the various components of the barrier member, and to increase tensile and internal shear strength of the product.

In a first embodiment, the invention relates to a stabilized fluid barrier member comprising at least a first outer sheet member having a top surface and a bottom surface. The fluid barrier member further comprises a stabilizer element overlying at least part of the first sheet member top surface and which abuts the top surface along at least a portion thereof. The stabilizer element contains a plurality of interstitial apertures adapted to hold at least one selectively fluid-impervient barrier material and for substantially preventing displacement of the barrier material from the apertures, notwithstanding the angular inclination at which the fluid barrier member is oriented. As indicated above, two or more different selectively fluid-impervient barrier materials may be placed, if desired, within the apertures in the stabilizer element, either separately or in admixture.

Barrier materials for use in the invention may, for example, be selected from among man-made materials such as the so-called "superabsorbent" polymer resin materials and naturally occurring materials such as sand, starch, e.g., corn starch and the water swellable colloidal clays, which are well known in the art. The invention is not limited to the use of these particular materials however, as substantially any barrier material having the intended effect, i.e., selectively blocking passage of one or more fluids, may be used in the invention. Such materials are commonly available in the marketplace and their identity would be readily apparent to those working in the field to which the invention is to be applied.

The phrase "selectively fluid-impermeable" as used herein means that the material chosen for use in a particular application is chosen according to its ability to prevent passage of one or more selected fluids (i.e., a liquid and/or a gas as that term is used herein) between a first location on one side of the barrier member and a second location on the other side thereof. That is, the fluid barrier material is not the same in every instance, nor is the invention limited to the use of just one such material at a time. Rather, the fluid-impervient material, or combination of materials, is chosen with the specific intent of preventing passage of one or more particular fluids through the barrier member, depending upon the intended application. One of ordinary skill in the art would readily be able to select the most useful barrier material(s) for preventing passage of a particular fluid without the need for undue experimentation since the properties of various barrier materials are well known in the art.

The fluid barrier member of the invention may, if desired, further comprise an (optional) second outer sheet member, also having a top surface and a bottom surface. When it is included, the second sheet member overlays at least a portion of the stabilizer element such that at least a portion of the second sheet member bottom surface abuts the otherwise uncovered surface of the stabilizer element. When the second member is not included, the barrier material may be retained within the stabilizer element using an appropriate mechanism such as an adhesive. In an alternate embodiment, the barrier material can be placed on a surface in the field and a unitary construct comprising a stabilizer element and top sheet member placed over it in a manner so as to substantially fill the apertures in the stabilizer element. This embodiment does not include a second sheet member.

In one embodiment of the invention, the first and/or second outer sheet members are formed of a geotextile. The most preferred geotextile is non-woven polyester. In an alternate embodiment of the invention, the first and/or second outer sheet members are geomembranes. A preferred geomembrane for use with the invention is polyethylene. Both the lower and optional upper (when included) sheet members need not be formed of identical materials.

Once the various components of the fluid barrier member of the invention are positioned in abutting stacked relation, they are preferably bonded together along at least a portion of their abutting surfaces to form a laminate wherein the stabilizer element is in contact with and bonded to both the first sheet member and, where present, the second outer sheet member. It is desirable, although not required, that the bond be formed along at least a portion of a peripheral edge of the barrier member to substantially prevent the escape of any of the barrier material from between the first and second outer sheet members.

The nature of the stabilizer element in which the selectively fluid-impermeable barrier material is deposited is determined by the nature of the impermeable material which is to be contained therein. For example, the stabilizer element could be either a geogrid or a geonet, as those terms are defined below, in a waste containment facility liner, wherein the element is preferably formed from a polymeric plastic. In alternate arrangements, however, the stabilizer element could be formed of a textile, wire mesh, honeycomb material or in any shape or configuration which is capable of preventing movement of the impermeable material and which can be bonded to the outer sheet member. The stabilizer element also provides increased bearing capacity to the barrier material and prevents the selectively fluid-impervient material from being squeezed out when, for example, waste material or construction equipment is placed above it.

In one embodiment of the invention, the stabilizer element is provided with stop rails formed integrally upon the element's surface. The stop rails facilitate prevention of sliding movement of the selectively fluid-impervient barrier material, e.g., when the barrier member is installed upon a surface which is not substantially horizontal, by creating an additional physical barrier to the movement of the fluid-impervient material and by providing additional surface area for bonding the stabilizer element with the first and (optional) second outer sheet members. A stabilizer element constructed as defined above also increases the shear and tensile resistance of a barrier member formed therewith.

In a still further embodiment, the invention comprises a stabilized geocomposite waste containment facility liner including a first outer sheet member having a top surface and a bottom surface. The first sheet member is formed from a material selected from the group consisting of geotextiles and geomembranes. The waste containment facility liner further comprises a stabilizer element, such as a geonet or geogrid, which overlays the top surface of the first outer sheet member and abuts the top surface along at least a portion thereof. The preferred stabilizer elements for use in constructing the liner are formed from a polymeric plastic.

The stabilizer element contains a plurality of interstitial apertures adapted for containing a water swellable colloidal clay and for substantially preventing displacement of the clay from the apertures, notwithstanding the angular inclination at which the liner is oriented. The water-soluble clay minerals preferred for use-with the invention are selected from the group consisting of attapulgite, brucite, chlorite, gibbsite, halloysite, illite, kaolinite, montmorillonite, vermiculite and the like.

The waste containment facility liner may, as noted above, optionally comprise a second outer sheet member, also formed from a material selected from the group consisting of geotextiles and geomembranes. The second outer sheet member has a top surface and a bottom surface and, when included, is positioned so as to overlie the stabilizer element such that at least a portion of the second sheet member bottom surface abuts the stabilizer element.

Upon stacking the components in abutting relation they are all bonded together along at least a portion of their abutting surfaces to form a bonded laminate in which the stabilizer element is in contact with and bonded to at least a portion of the first sheet member and, optionally, the second outer sheet member.

In one embodiment of the geocomposite waste containment facility liner described above, the first and/or second outer sheet members are formed from geotextiles. One preferred geotextile is non-woven polyester. In another embodiment, the first and/or second outer sheet members are geomembranes. A preferred geomembrane for use in forming the geocomposite waste containment facility liner of the invention is polyethylene.

A still further embodiment of the invention concerns a method for forming a stabilized fluid barrier member, which method comprises, in a first step, providing a first outer sheet member formed from a material selected from the group consisting of geotextiles and geomembranes. The first outer sheet member has a top surface and a bottom surface.

A further step in forming the barrier member of the invention involves positioning, upon the top surface of the first sheet member and in abutting relation with at least a portion of the first outer sheet member top surface, a stabilizer element containing within the element a plurality of interstitial apertures adapted to contain a selectively fluid-impervient barrier material and to substantially prevent displacement of the barrier material from the apertures, notwithstanding the angular inclination at which the fluid barrier member is oriented during manufacture, transport, installation, and/or use. The interstitial apertures formed by the stabilizer element are at least partially filled with one or more selectively fluid-impervient barrier materials. Various fluid-barrier materials may be deposited within the interstitial apertures, either singly or in combination, depending upon which fluid(s) is/are to be barred from passage in a particular application.

Thereafter, a second outer sheet member may optionally be positioned on top of the stabilizer element. The optional second sheet member also has a top surface and a bottom surface and is formed; as is the first member, from a material selected from the group consisting of geotextiles and geomembranes. The second sheet member, when included, is positioned atop the stabilizer element in a manner such that at least a portion of the second sheet member bottom surface is in abutting relation with an upper surface of the stabilizer element. Subsequently, the first and, where present, the second outer sheet members and the stabilizer element are all bonded together along at least a portion of their abutting surfaces to form a laminated fluid barrier member wherein the stabilizer element is in contact with and bonded to at least a portion of the first outer sheet member and, where present, the second outer sheet member. Where the optional second sheet member is not included, an adhesive may be used, if desired, to retain the barrier material within the apertures in the stabilizer element.

In an alternate embodiment, the barrier material is placed on a surface and a unitary construct, comprising a stabilizer element formed integral with or bonded to an outer sheet member is placed over the material such that the apertures in the stabilizer element are filled with the barrier material. The dirt overlying the barrier member retains the barrier material in the stabilizer element.

Alternately, in a still further embodiment, the unitary construct described above may simply be positioned at the job site, whereupon the stabilizer element is filled with one or more fluid impervient materials and the resultant barrier member is covered with, e.g., soil or sand. Prior to burying the barrier member described above, i.e., having only one outer sheet member, under soil or sand, it may in some instances be desirable to, for example, deposit a protective layer across the exposed surface of the barrier material, e.g., to hinder the passage of moisture from the surrounding soil directly into the barrier material.

The bonding operation may be carried out using a variety of methods well known in the art. Preferably, bonding is achieved by a method selected from heat bonding, infrared welding, ultrasonic welding, adhesive bonding and combinations thereof. As noted above, it is desirable, although not required, to form the bond along a peripheral edge portion of the barrier member components to substantially prevent the barrier material from escaping from in between the first and second outer sheet members and preventing shear failure through the liner after hydration.

DETAILED DESCRIPTION OF THE PREFERRED EMBODIMENTS

Figure 1:
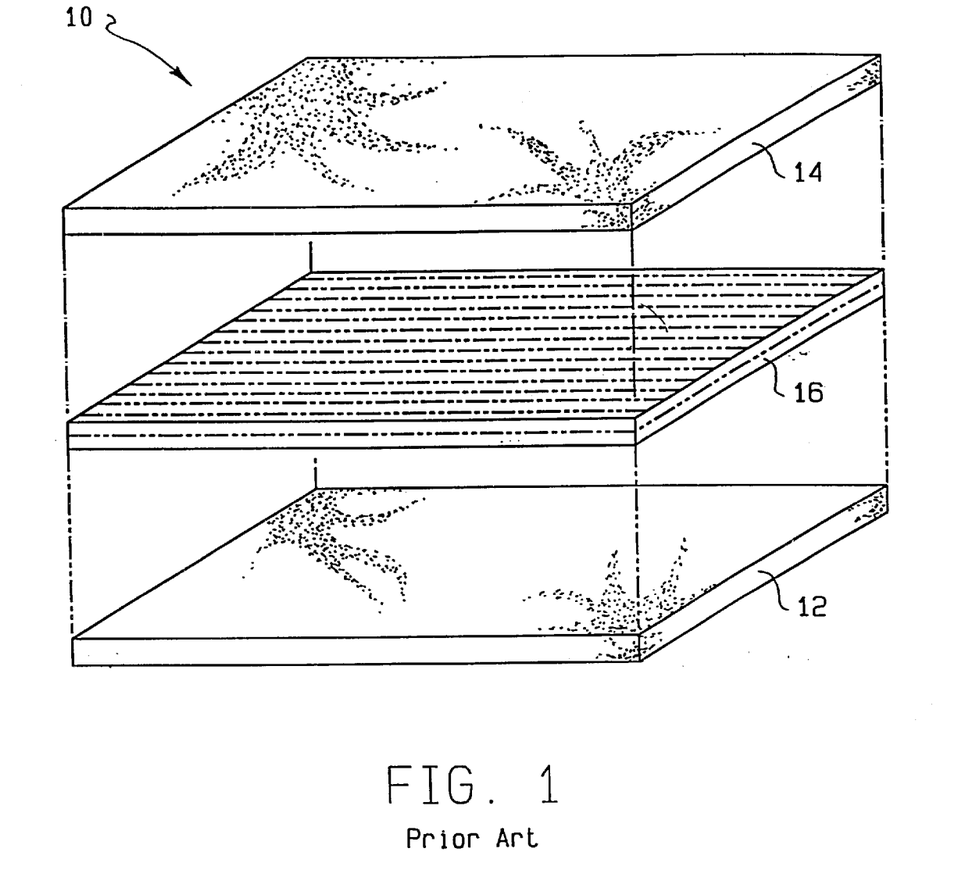
FIG. 1 is an exploded perspective view of a representative unstrengthened prior art geosynthetic clay waste containment facility liner.

Turning initially to FIG. 1 there is illustrated a typical example of an unstrengthened geosynthetic clay waste containment facility liner ("GCL") 10. GCL 10 generally comprises a first sheet 12 and a second sheet 14 of geosynthetic material sandwiching a layer of a water-swellable colloidal clay 16, which is typically bentonite. As illustrated, the geosynthetic material used in forming the GCL is a geotextile, but geomembranes are also used in place of the geotextiles for specific applications. Geotextiles most commonly used in forming such GCLs include woven and non-woven polyesters. A commonly used geomembrane is high density polyethylene ("HDPE"). Original GCLs, of the type illustrated in FIG. 1, are typically held together with the use of glue or some other type of adhesive.

As used herein, the term "geosynthetic" relates generically to all synthetic materials used in geotechnical engineering applications. Moreover, the term "geotextile" is herein defined to include any permeable or non-permeable textile used with foundation, soil, rock, earth or any other geotechnical engineering related material as an integral part of a man-made project, structure or system. A "geomembrane", on the other hand, is defined as an essentially impermeable membrane used as a liquid or vapor barrier in any of the applications described above with regard to geotextiles.

Figure 2:
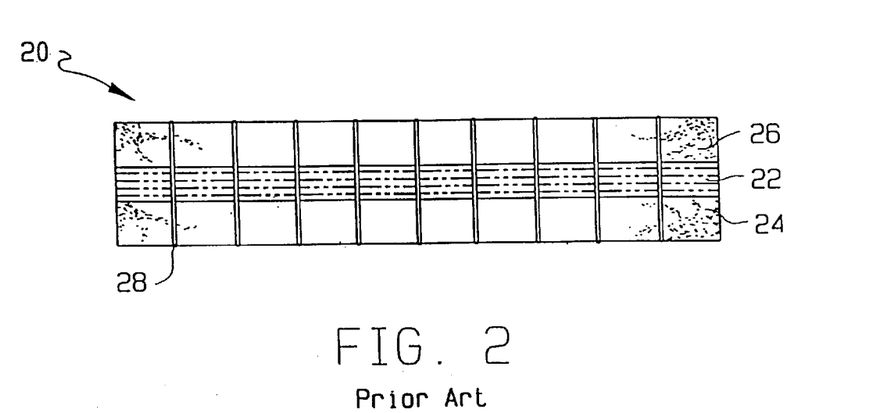
FIG. 2 is a sectional view through a representative prior art strengthened geosynthetic clay waste containment facility liner.

FIG. 2 illustrates the general appearance of a typical prior art strengthened GCL 20. Strengthened GCL 20 is similar in many respects to GCL 10 in that it comprises a layer of water-soluble colloidal clay 22, e.g., bentonite, sandwiched between two geotextile sheets 24, 26, or alternately, encompassed by one or two geomembranes (not shown). In strengthened GCL 20, the two geotextile sheets 24, 26 are joined by needle punching a plurality of, e.g., polyester or polypropylene fibers 28, from one geotextile through the other geotextile and the intervening bentonite layer in a mechanical bonding process using barbed needles. The fibers 28 may be secured, for example, by anchoring them with a frictional connection, i.e., wherein they become tangled with the fibers of the geotextile. The bond provided by fibers 28 serves a two-fold purpose, i.e., (1) to hold the GCL together during handling and deployment and (2) to provide increased in-plane shear strength after deployment.

In the field, GCLs of the type illustrated in FIGS. 1 and 2 are self-sealing at the overlaps between panels (see, e.g., Estornell, P. and Daniel, D. E., *Journal of Geotechnical Engineering*, Vol. 118, No. 10, October, 1992, pp. 1592–1606). That is, when water hydrates the clay in the GCL, the clay swells and automatically seals the overlap. If desired, however, a small amount of loose granular bentonite can be placed between the panels at the point of overlap to assist in self-sealing upon hydration.

Figure 3:
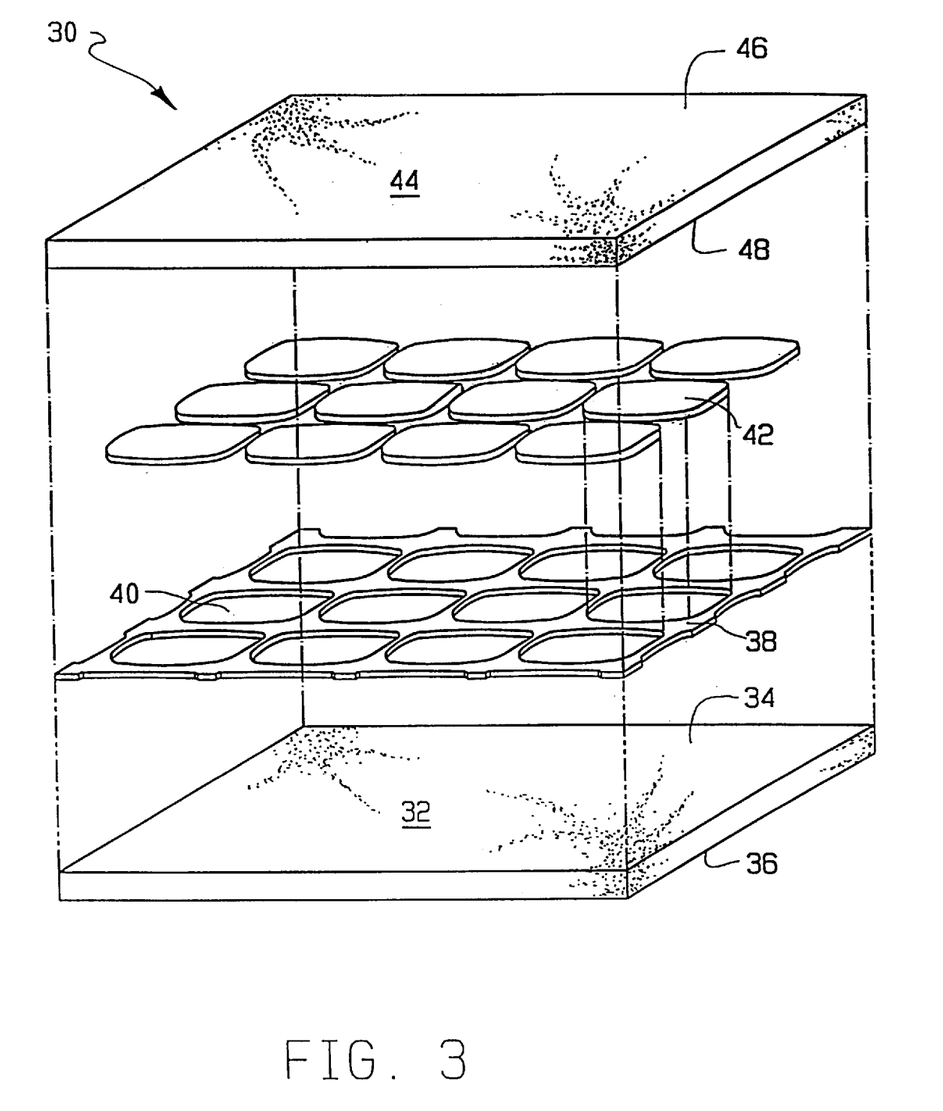
FIG. 3 is an exploded perspective view of one embodiment of a stabilized fluid barrier member formed according to the present invention comprising two outer sheet members.

Turning now to FIG. 3, there is illustrated one embodiment of the stabilized fluid barrier member 30 of the present invention. Barrier member 30 is comprised of a first outer sheet member 32 having a top surface 34 and a bottom surface 36. Overlaying at least a portion of top surface 34, preferably the entire top surface of sheet 32, is stabilizer element 38. Stabilizer element 38 abuts top surface 34 of first sheet 32 along at least a portion of the top surface. Stabilizer element 38 contains a plurality of interstitial apertures 40. Apertures 40 are adapted to contain a quantity of one or more selectively fluid-impervient barrier materials 42 and for substantially preventing displacement of material(s) 42 within barrier member 30, notwithstanding the angular orientation at which barrier member 30 is oriented during manufacture, storage, transport, installation or while in use.

The barrier member 30 of the invention may additionally comprise, if desired, an optional second outer sheet member 44 having a top surface 46 and a bottom surface 48. Second sheet member 44, when included, overlies at least part of the stabilizer element 38 and preferably covers the entire element 38. One advantage of forming a barrier member 30 without a second (i.e., upper) outer sheet member is that such a construction has an enhanced shear resistance due to the interlock which occurs between the stabilizer element which contains the barrier material and the soil underlying or overlying member 30. The interlock occurs due to the weight of this soil against barrier member 30. In addition, the pressure of this soil keeps the barrier material from exiting the apertures in the stabilizer element, even when member 30 is installed upon a sloped surface.

After the various components 32, 38, 42, 44 (optional) of barrier member 30 are arranged in stacked relation, they are all bonded together along at least a portion of their abutting surfaces to form a laminate wherein stabilizer element 38 is in contact with and bonded together with both the first 32 and second 44 sheet members. Not all the areas which are in contact are necessarily bonded, however. The proportion of the surface which is actually bonded is a matter of discretion, depending upon the strength of the bond required for a specific application.

First sheet member 32 and (optional) second sheet member 44 are formed from either a geotextile or a geomembrane. Preferred geotextiles for use with the invention include, but are not limited to, woven and nonwoven polypropylene, polystyrene, polyester polyamide (e.g., nylon), polypropylene-polyethylene copolymers and polypropylene-polyamide copolymers. The thickness of the textile fabric is not critical and may range between about 3–30 mils or 2 to 36 ounces per square yard. The most preferred geotextile for use in forming the outer sheet members 32, 44 is a four to sixteen ounce per square yard nonwoven polyester geotextile.

Alternately, as noted above, geotextiles may be replaced by geomembranes for use with the invention. Such geomembranes may be formed, for example, from materials such as polyolefins, chlorosulfonated polyethylenes, silicone rubbers, polyisoprenes, polyesters, polyamides (e.g., nylon), polyvinyl chlorides, flexible polypropylene and polystyrenes. Preferred polyolefins include but are not limited to polypropylene, polyethylene and polybutylene. Polyethylene is the most preferred polyolefin material for use in forming the geomembranes used in the invention. If desired, for certain applications where barrier member 30 comprises both first 32 and second 44 sheet members, the two sheet members can be formed out of different materials, e.g., wherein one is a geotextile and one is a geomembrane, or wherein they are formed from two different geotextiles or two different geomembranes.

Preferred stabilizer elements 38 for use with the invention include geogrids 38 (shown in FIG. 3) and geonets (see, e.g., FIG. 4), although various other constructions, such as an entangled mesh (see, e.g., FIG. 5 and the discussion thereof below), may be used in the invention. As used herein, the term "geogrid" means a deformed or nondeformable gridlike polymeric material found by intersecting ribs joined at the junctions and used to provide increased tensile capacity, reinforcement and bearing capacity. A particularly suitable geogrid for use with the present invention is the TENSAR GEOGRID manufactured by the TENSAR Corporation located in Morrow, Ga.

Figure 3A:
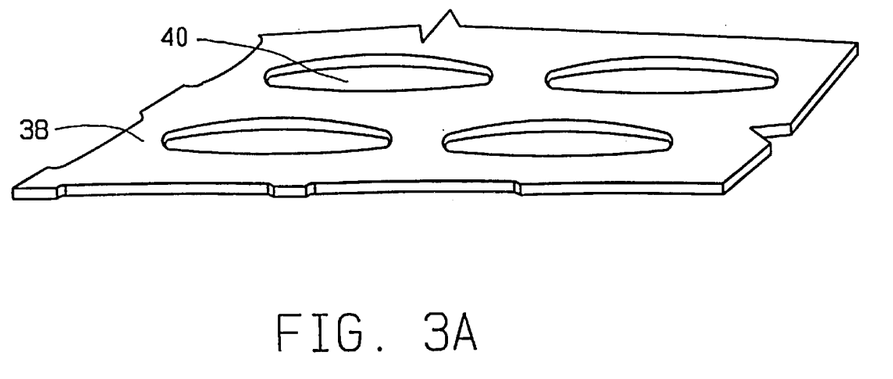
FIGS. 3A and 3B are partial perspective views illustrating alternate configurations of the geogrid stabilizer element shown in FIG. 3.
Figure 3B:
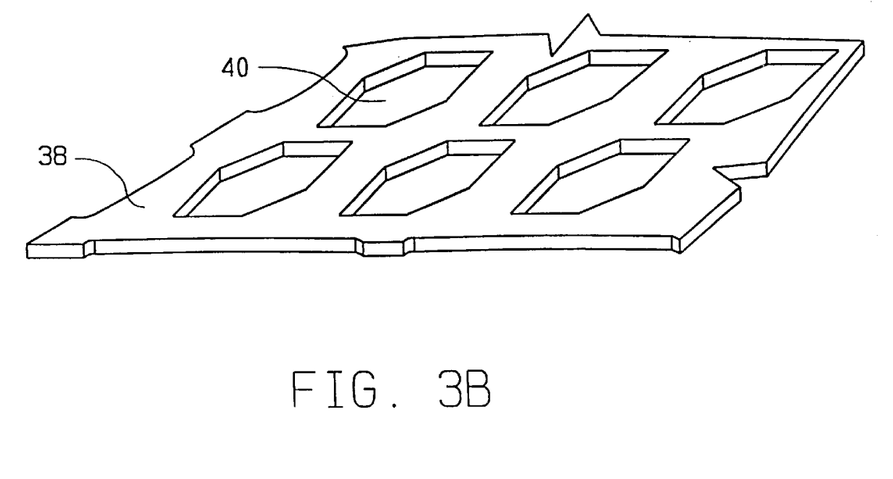

FIGS. 3A and 3B illustrate alternate embodiments of the invention in which the apertures contained within the geogrid are not substantially rectangular as shown in FIG. 3, but instead are, respectively, ellipsoidal and hexagonal in shape. As one of ordinary skill in the art would recognize, the apertures may be virtually any size and shape and may be configured in virtually any arrangement. In a preferred embodiment however, apertures 40 are of a minimum size, i.e., at least about 0.4 inch by 0.4 inch in plan dimension and 0.2 inch thick. The preferred material for forming the geogrids and geonets of the invention is a polymeric plastic, such as polyethylene and the like. Most preferred is high density polyethylene.

Returning to FIG. 3, contained within aperture 40 in stabilizer element 38 is a quantity of one or more relatively fluid-impermeable materials, either individually or in admixture. In a preferred embodiment of the invention, a layer of an adhesive is first sprayed into the empty apertures to prepare them for the addition of material 42. If desired, material 42 may be added to the apertures in batches with an adhesive layer being interposed between each (or some) batches. When the apertures are completely filled, a final adhesive layer may be applied (e.g., by spraying) across the upper surface of filled element 38 to "cap" the element, that is, to prevent spillage of material 42 out of element 38 when barrier member 30 is angled or tilted. This adhesive is particularly useful in those applications which do not include a second (i.e., upper) sheet member.

In a further alternate embodiment of the invention, the barrier member of the invention comprises a first outer sheet member and a stabilizer element either formed integral with the sheet member or bonded thereto. The apertures in the stabilizer element are substantially filled with at least one fluid-impervient barrier material, either on-site or at a factory where the barrier member is fabricated. Once the barrier member is installed at the job site, the uncovered surface of the stabilizer element is covered by a protective material. This protective material may be, for example, a second geomembrane or geotextile sheet which may be simply laid over the stabilizer element without bonding to the stabilizer element or to the first sheet member. Alternately, for example, an adhesive or a geomembrane material dissolved in a suitable solvent could be sprayed onto the filled stabilizer element to form a "cap" or layer thereover. As the solvent evaporates, the adhesive or geomembrane bonds to the, barrier material, the stabilizer element and optionally to the first sheet member to protect the underlying materials by e.g., hindering or substantially blocking the passage of water from the surrounding soil once the barrier member is in operation.

In a still further embodiment the barrier material chosen for use with the invention is a material which undergoes a phase change, e.g., from a liquid or a gel to a solid, upon contact with a particular fluid, the passage of which the barrier member is intended to block. In a situation where the barrier member has only one outer sheet member bonded or formed integrally with the stabilizer element, a second protective layer, e.g., a geotextile or geomembrane sheet, can be laid over the exposed surface of the filled stabilizer element, in contact with the barrier material in the apertures of the stabilizer element, without bonding the second protective sheet to any portion of the barrier member. Thereafter, when the barrier material undergoes a phase change, i.e., when it solidifies from a liquid or a gel to a solid, the second sheet member is effectively bonded to the barrier member by being "captured" by the solidified barrier material.

Possible fluid-impermeable materials for use with the invention include, but are not limited to the man-made materials known in the art as "superabsorbent" polymer resin materials and, in addition, naturally occurring materials such as, sand, starch, e.g., corn starch and the swellable colloidal clay minerals. For a discussion and description of various superabsorbent polymer resins see, e.g., Askari, et al., "Synthesis and Characterization of Acrylic-Based Superabsorbents", *Journal of Applied Polymer Science*, Vol. 50, No. 10, Dec. 10, 1993, pp. 1851–1855, the disclosure of which is incorporated herein by reference. As noted above, a wide variety of additional natural and man-made materials may be chosen for use as the barrier material depending upon the proposed application for the barrier member and the invention is not limited to use with the specific examples which are provided above.

In preferred embodiments of the invention, the superabsorbent polymer resins and/or the colloidal clays may be used in either their dry or hydrated form, with any degree of water content. Preferred superabsorbent polymer resins for use in the invention include polyacrylic acid/polyalcohol grafted copolymers, polyacrylate homopolymers, polyacrylate/polyalcohol copolymers, polyacrylate/polyacrylamide terpolymers, polyacrylonitriles, and polyacrylate, acrylamide and cross-linked polyacrylic acid. A preferred natural absorbent is starch, e.g., corn starch.

Suitable superabsorbents include those sold under the trade names Dynasorb-Terrasafe, Dynasorb-Aquasafe, Dynasorb-PestiSafe and Dynasorb-Acidsafe, all of which are manufactured by Stockhausen Inc. located in Greensboro, N.C. The "Acidsafe" product is used to bar passage of acids, including sulfuric acid, boric acid, acetic acid, nitric acid, hydrochloric acid, phosphoric acid and the like, whereas the "Aguasafe" and "Terrasafe" products are useful in barring passage of, for example, materials such as oil, diesel fuel, jet fuel, paints, lacquers, thinners, gasoline, citrus oil and transmission fluid.

As noted above, one use for the fluid barrier member 30 of the invention is in forming a geosynthetic clay liner for use in waste containment facilities. In such products, the fluid-impermeable material 42 of choice is a water-swellable colloidal clay mineral. Preferred clay minerals include attapulgite, brucite, chlorite, gibbsite, halloysite, illite, kaolinite, montmorillonite, vermiculite and the like. By far, the most preferred of these is granulated sodium bentonite, a montmorillonite clay.

The clay is most preferably deposited within the apertures in the stabilizer element at the rate of about one pound per square foot of the liner. Since the invention uses substantially the same amount of clay as is found in prior art GCL, the barrier member 30 of the invention provides similar or even reduced hydraulic conductivities, i.e., within the required range, to those achieved in the prior art products.

The lower hydraulic conductivity values obtainable with the invention result from the stabilizer element confining lateral expansion of the bentonite and the first and second sheet members resisting vertical expansion thereof. The resistance to expansion results in a tighter packing of the bentonite and a lower value of hydraulic conductivity than is found in existing GCL products.

Some physical characteristics which distinguish bentonite from other clays are its permeable texture and its extremely small grain size. The strong absorptive power of commercial bentonite, which will absorb almost 5 times its weight of water, is partially attributable to the preponderance of extremely small grains or particles, providing tremendous surface area for the exertion of absorptive powers and the film retaining capacity of these particles.

The bentonite granules for use with the present invention preferably range in size from that capable of passing through a 200 mesh U.S. Standard Sieve (0.003 inch grain diameter) upwards to about $3/16$ to $5/16$ of an inch, most preferably between about 0.003 to about $1/4$ inch. The grain particles, when wetted, absorb films of water that are thicker than the films which form on other clay-like materials, and after the bentonite has been wetted the water cannot be expelled, even at high pressures. An important aspect of the swelling of bentonite is that it will swell to the extent necessary to fill available space and exert pressure when confined against further swelling. This leads to lower values of hydraulic conductivity than existing GCL products because the stabilizer element does not allow unrestrained swell.

The various components of the stabilized fluid barrier member 30 of the invention are therefore stacked and then laminated by bonding them all together along at least a portion of their abutting surfaces. The bond is preferably formed along an outer peripheral edge portion of the stack to prevent leakage of the selectively fluid-impervient material from member 30. Alternately, or in addition, however, member 30 may also be bonded together at points within the laminate located inwardly from the peripheral edge. For this purpose, the stabilizer element may be provided with stop rails (discussed below with regard to FIG. 6) which act as a further barrier to sliding movement of the barrier material and which, in addition, provide additional surface area for attaching the first and second outer sheet members 32, 44 to the stabilizer element 38, thus strengthening the bond among these components.

In an alternate embodiment of the method of making barrier member 30, a combination geomembrane or geotextile/geogrid or geonet is extruded or otherwise manufactured as a unitary construct, i.e., as a single component. This construct may then be transported directly to the site where it is desired to form a barrier, and installed in place. Thereafter, the apertures in the geonet or geogrid are filled with one or more barrier materials, thus creating barrier member 30. In an alternate embodiment, if desired, a second (optional) geotextile or geomembrane may be laid atop the barrier material, or even bonded thereto, e.g., to protect against loss or oversaturation of the barrier material in areas of high humidity or precipitation and unrestrained swell.

The thickness of a geosynthetic clay liner produced as discussed above ranges between about one-quarter inch to two inches. The cost of production is approximately 50¢/ft$^2$–$1.50/ft$^2$, i.e., only slightly more expensive than the strengthened GCLs of the prior art.

Bonding of the laminate components can be, carried out by a variety of methods well known in the art. The preferred methods include adhesive bonding, ultrasonic welding, infrared welding and most preferably, heat bonding, or combinations of the above methods. The heat bonding process is carried out, as would be well known in the art, by at least partially melting the plastic geonet or geogrid by the application of thermal energy and applying pressure to force a portion of the geotextile(s) or geomembrane(s), into the melted material so as to form a plurality of "weld points" between the first and optionally, the second outer sheet (i.e., geotextile or geomembrane) and the stabilizer element. The amount and duration of the thermal treatment and the number and location of weld points may be varied as necessary, depending upon the strength desired for the bond and the intended application for the finished product.

In an additional embodiment of the invention, to facilitate manufacture the stabilizer element and a geomembrane or a geotextile forming the first outer sheet member are manufactured as a single, integrated component as described above, thus obviating the necessity of bonding them together later on. This method is especially cost effective and time saving in those applications which do not require a second outer sheet since one thus need only, for example, extrude a combination geomembrane or geotextile/geogrid or geonet as described above and then pack the grid or net with barrier material.

Heat bonding as described above results in high peak and residual internal strengths by preventing shear failure through the bentonite. In addition, it prevents damage to the barrier member 30 during swelling of the fluid-impervient material, e.g., bentonite, during hydration and prevents material failure of the member 30 due to shear forces. Such swelling will not burst the bonds, particularly thermal bonds, such as may be used in the present invention in contrast to prior art products wherein swelling of the bentonite upon hydration has been known to tear or pull out the vertical stitching connecting the geotextiles.

Figure 4:
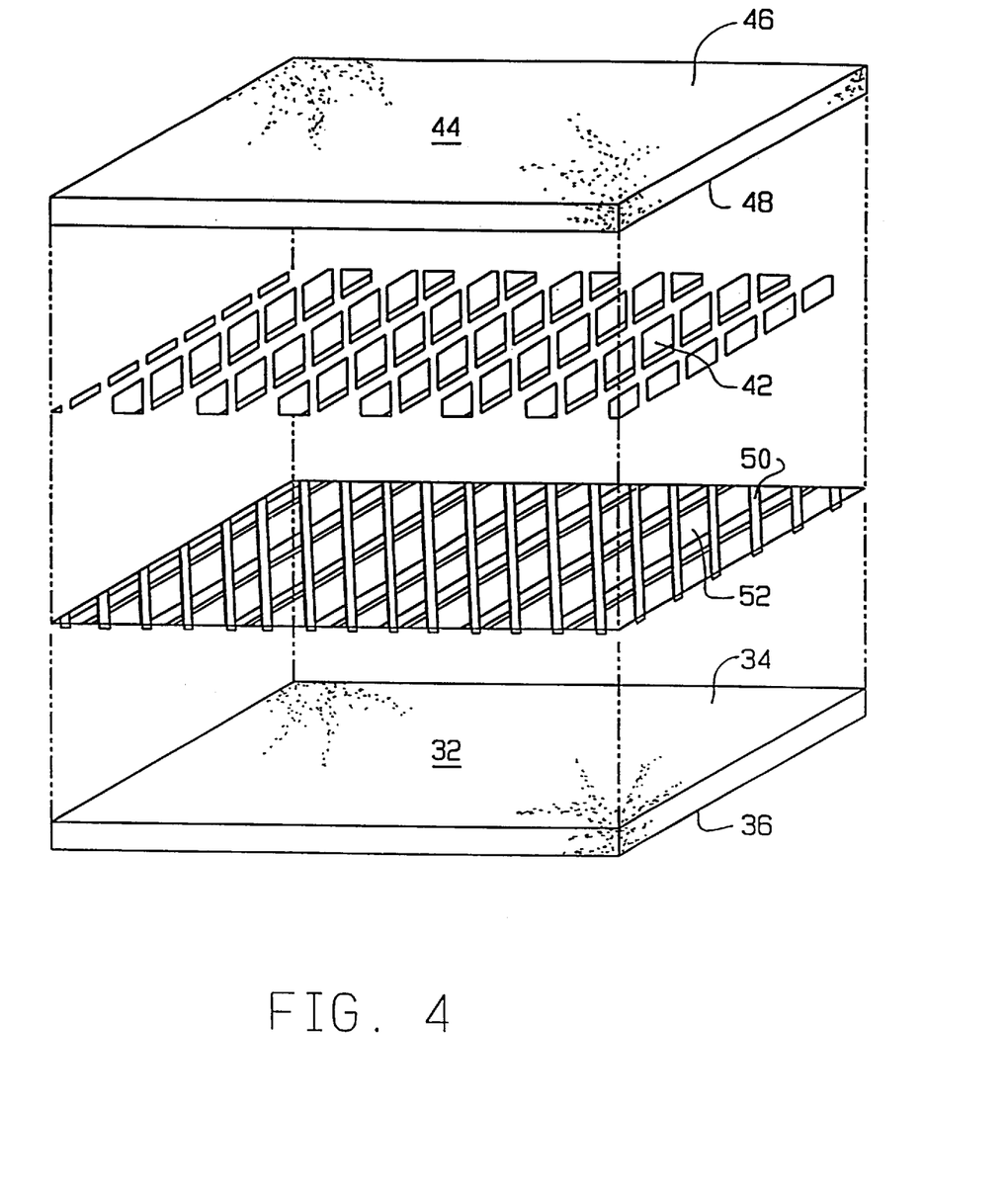
FIG. 4 is an exploded perspective view of an alternate embodiment of a stabilized fluid barrier member formed according to the invention.

FIG. 4 illustrates a barrier member constructed according to the invention which is in many respects identical to that illustrated in FIG. 3. For this reason, the same numbers have been used to identify similar structural elements in FIGS. 3 and 4. One difference, however, between the barrier member 30 shown in FIG. 3 versus that illustrated in FIG. 4 is that the stabilizer element 50 in FIG. 4 is a geonet, not a geogrid. A "geonet" is defined as a netlike polymeric material formed from intersecting ribs integrally joined at the junctions. As can be seen from FIG. 4, the geonet 50 presents a different, i.e., woven, appearance than the geogrid, i.e., the apertures 52 among the woven strands are less regular in appearance. In a manner similar to that shown in FIG. 3, the selectively fluid-impermeable material 42 in the embodiment shown in FIG. 4 is deposited within the apertures 52 of the geonet 50 and is thus prevented from being substantially displaced within barrier member 30, notwithstanding the angular orientation of member 30. The preferred material for forming the geonets of the invention is a polymeric plastic such as polyethylene and the like. Most preferred is high density polyethylene.

Figure 5:
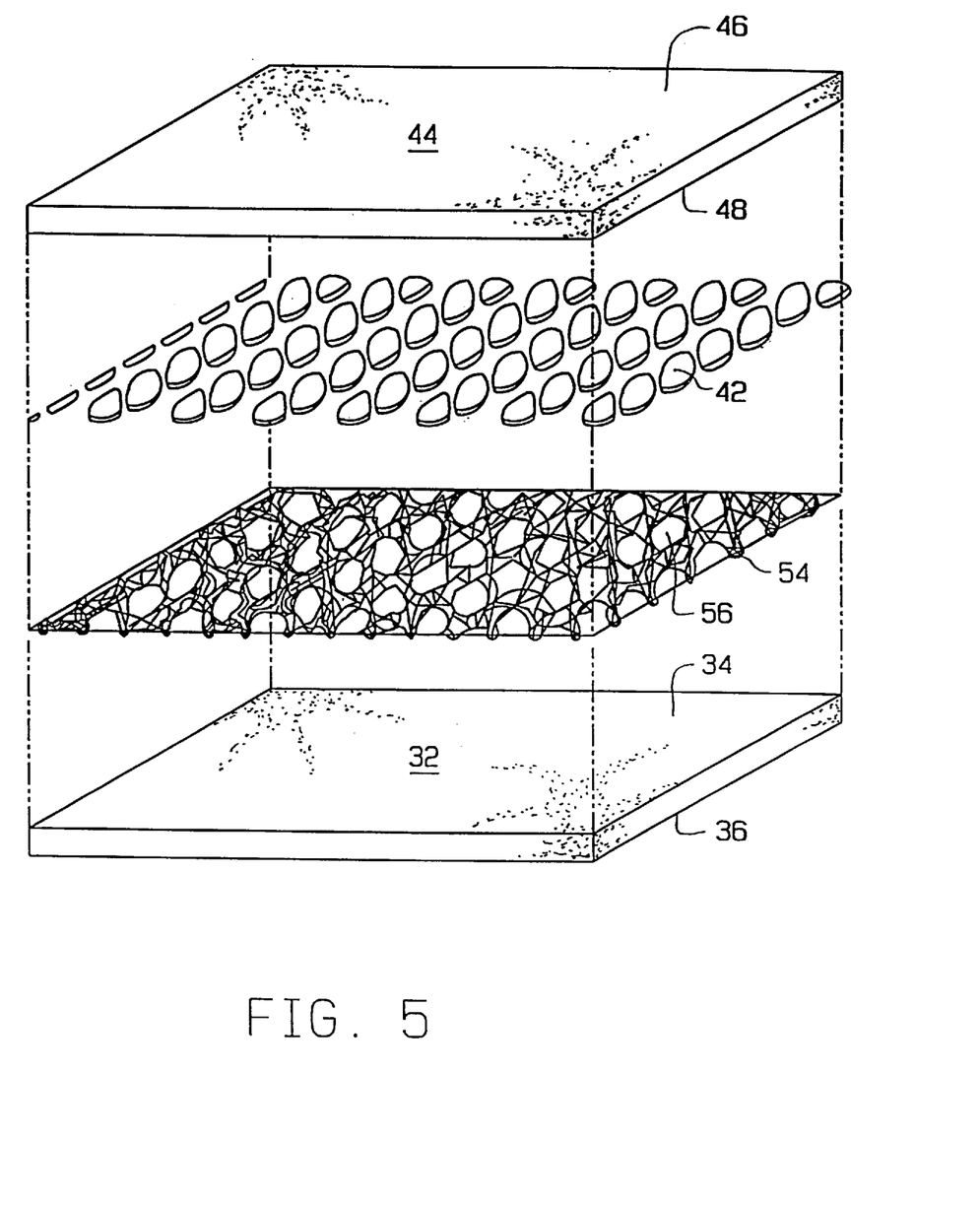
FIG. 5 is an exploded perspective view of another alternate embodiment of a stabilized fluid barrier member formed according to the invention.

FIG. 5 illustrates still another embodiment of a barrier member constructed according to the invention. As above, it is in many respects similar to the constructions shown in FIGS. 3 and 4 and thus similar structures are again numbered alike. FIG. 5 illustrates the use of an entangled mesh 54 as the stabilizer element. The selectively fluid-impermeable material 42 is deposited within the apertures 56 defined by the entangled mesh 54 and are thus prevented from becoming displaced when the barrier member is tilted, rotated or otherwise moved out of a substantially horizontal plane, e.g., during manufacture, transport and/or use.

Figure 6:
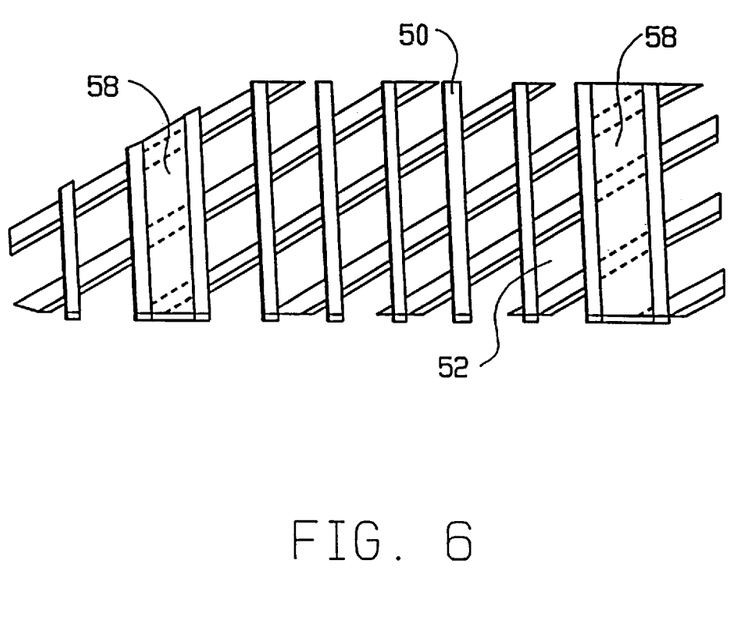
FIG. 6 is a partial plan view illustrating several stop rails upon the surface of a stabilizer element.

FIG. 6 illustrates a stop rail 58 formed integrally on the surface of, for example, the geonet stabilizer element shown in FIG. 3. A geonet 50 is shown in FIG. 5 for purposes of illustrating the stop rails used in the invention, but the use of stop rails is not limited to geonets, i.e., they can also be formed upon geogrids as well as other constructions used to form the stabilizer element. By increasing the width of one rail or filling in a row of apertures, any fluid-impervient material which does manage to escape from aperture 52 does not all collect in one location. Rather it is scattered in all directions, preventing the build-up of excessive shear which may otherwise damage the barrier member. As can be seen-from FIG. 6, the stop rails 58 are rails which are built up in height or width to that of the adjacent rails to prevent, as much as possible, shifting of material 42 out of apertures 52. An additional beneficial effect of rails 58 is that they increase the bonding area between the stabilizer element and the geotextile or geomembrane in those applications when barrier member 30 comprises such a second sheet member.

In one embodiment of the invention, the stop rails 58 are located along the outer peripheral edges of the stabilizer member, adjacent the outer edges of the laminate. The invention is not limited to this configuration, however, as any desired number of stop rails may be employed at any desired location(s) upon the stabilizer element. The number and spacing of these rails is a function of several factors, i.e., the nature of the stabilizer element, the angle at which the barrier member of the invention is to be installed, the relative coarseness or fineness of the fluid-impervient materials chosen for use with the invention, and the shear resistance required to prevent failure through the impervient material.

As would be well recognized by one of ordinary skill in this art, the invention described and illustrated herein is capable of a variety of modifications. All such modifications falling within the spirit and scope of the appended claims are believed to form part of applicant's invention.

I claim:

1. A method of forming a stabilized containment facility liner, which method comprises:

providing a first outer sheet member formed from a material selected from the group consisting of geotextiles and geomembranes, said sheet member having a top surface and a bottom surface;

positioning, upon the top surface of said first sheet member, a stabilizer element having a plurality of interstitial apertures adapted to contain a selectively fluid-impervient barrier material and to substantially prevent said barrier material from flowing out of said liner notwithstanding the angular inclination at which said liner is oriented, said stabilizer element abutting at least a portion of said first outer sheet member top surface;

at least partially filling the interstitial apertures of said stabilizer element with at least one selectively fluid-impervient barrier material; and bonding together said first sheet member and said stabilizer element along at least a portion of their abutting surfaces to form a laminate having a sufficient tensile resistance and shear strength to maintain stability of said liner upon a sloped surface and sufficient compressive strength to prevent any substantial change in liner thickness after manufacture thereof, wherein the stabilizer element is in contact with and bonded to at least a portion of said first sheet member.

2. The method of claim 1 wherein said bonding is carried out by a method selected from the group consisting of heat bonding, ultrasonic welding, infrared welding, adhesive bonding and combinations thereof.

3. The method of claim 1 which further comprises choosing said at least one selectively fluid-impervient barrier material according to the identity of the fluid whose passage is intended to be prevented by said material.

4. A method of forming a stabilized containment facility liner, which method comprises:

forming a unitary construct comprising a first sheet member formed from a material selected from the group consisting of geomembranes and geotextiles, said first sheet member having a top surface and a bottom surface, and a stabilizer element formed integrally upon one of said surfaces, said stabilizer element having a plurality of interstitial apertures adapted for containing a selectively fluid-impervient barrier material and for substantially preventing said barrier material from flowing out of said liner notwithstanding the angular inclination at which said liner is oriented;

substantially filling said apertures in said stabilizer element with at least one selectively fluid-impervient barrier material; and positioning a covering material upon an uncovered surface of said barrier material, wherein said uncovered surface is opposed to the surface of said element covered by said first sheet member and wherein said liner has a sufficient tensile resistance and shear strength to maintain stability thereof upon a sloped surface and sufficient compressive strength to prevent any substantial chance in liner thickness after formation thereof.

5. The method of claim 4 wherein said protective covering material is an outer sheet member formed from a material selected from the group consisting of geomembranes and geotextiles and wherein said sheet member is spread out atop the uncovered surface of said barrier material.

6. The method of claim 4 wherein said protective covering material is applied onto the uncovered surface of said barrier material in admixture with a solvent and wherein, upon evaporation of said solvent, said covering material adheres and is bonded to at least a portion of said barrier material.

7. The method of claim 6 which further comprises bonding said covering material to at least a portion of said unitary construct.

8. The method of claim 4 which further comprises choosing a barrier material which undergoes a phase change upon contact with a particular fluid, the passage of which is to be prevented by said liner.

9. The method of claim 8 wherein said barrier material undergoes a phase change to a solid upon contact with said particular fluid, and wherein solidification of said barrier material bonds at least a portion of said protective covering material in contact with said barrier material to said liner.

10. A method of forming a stabilized containment facility liner on-site, which method comprises:

forming a unitary construct comprising a first sheet member formed from a material selected from the group consisting of geomembranes and geotextiles, said first sheet member having a top surface and a bottom surface, and a stabilizer element formed integral with one of said surfaces, said stabilizer element having a plurality of interstitial apertures adapted for containing a selectively fluid-impervient barrier material and for substantially preventing said barrier material from flowing out of said liner notwithstanding the angular inclination at which said liner is oriented;

transporting said construct to a site selected and prepared for emplacement of a containment facility liner; and positioning said construct at said site with said stabilizer element facing upwardly; and substantially filling said apertures in said stabilizer element with at least one selectively fluid-impervient barrier material to form a containment facility liner having a sufficient tensile resistance and shear strength to maintain stability thereof upon a sloped surface and sufficient compressive strength to prevent any substantial change in liner thickness after formation thereof.

11. The method of claim 10 which further comprises depositing a sufficient quantity of a material selected from the group consisting of earth, sand and waste upon said liner to substantially cover said liner.

12. A method of forming a stabilized containment facility liner on-site, which method comprises:

forming a unitary construct comprising a first sheet member formed from a material selected from the group consisting of geomembranes and geotextiles, said first sheet member having a top surface and a bottom surface and a stabilizer element formed integral with one of said surfaces, said stabilizer element having a plurality of interstitial apertures adapted for containing a selectively fluid-impervient barrier material and for substantially preventing said barrier material from flowing out of said liner notwithstanding the angular inclination at which said liner is oriented;

transporting said construct to a site selected and prepared for emplacement of a containment facility liner;

depositing upon said site a sufficient quantity of at least one selectively fluid-impervient barrier material to substantially fill the apertures in said stabilizer element;

orienting said construct at said site such that said stabilizer element contacts said fluid-impervient barrier material; and applying said construct to said site in a manner such that the apertures in said stabilizer element are substantially filled with said fluid-impervient barrier material so as to form a containment facility liner having a sufficient tensile resistance and shear strength to maintain stability thereof upon a sloped surface and sufficient compressive strength to prevent any substantial chance in liner thickness after formation thereof.

13. The method of claim 12 which further comprises depositing a sufficient quantity of a material selected from the group consisting of earth, sand and waste upon said liner to substantially cover said liner.

14. A method of forming a containment facility liner, which method comprises:

producing a unitary construct comprising a first sheet member, a second sheet member and a stabilizer element interposed between said first and said second sheet members and formed integral therewith, said stabilizer element having a plurality of interstitial apertures adapted for containing a selectively fluid-impervient barrier material and for substantially preventing said barrier material from flowing out of said liner notwithstanding the angular inclination at which said liner is oriented; and substantially filling said apertures in said stabilizer element with at least one selectively fluid impervient barrier material to form a containment facility liner having a sufficient tensile resistance and shear strength to maintain stability of said liner upon a sloped surface and sufficient compressive strength to prevent any substantial change in line thickness after formation thereof.

15. The method of claim 14 which further comprises forming at least one of said sheet members from a material selected from the group consisting of geotextiles and geomembranes.

16. The method of claim 14 which further comprises forming at least one of said sheet members from a geotextile and selecting said geotextile from the group consisting of woven and non-woven polypropylene, polystyrene, polyester, polyamide, polypropylene-polyethylene copolymers and propylene-polyamide copolymers.

17. The method of claim 14 which further comprises forming at least one of said sheet members from a geomembrane and selecting said geomembrane from the group consisting of polyolefins, chlorosulfonated polyethylenes, silicone rubber, polyisoprene, polyester, polyamide, polyvinyl chloride and polystyrene.

18. The method of claim 14 wherein said stabilizer element is configured in a form selected from the group consisting of geonets and geogrids.

19. The method of claim 14 which further comprises selecting said selectively fluid-impervient barrier material from the group consisting of superabsorbent polymer resins, sand, starches and water-swellable colloidal clay minerals.

20. The method of claim 14 which further comprises selecting, as said barrier material, a superabsorbent polymer resin selected from the group consisting of polyacrylonitrile, polyacrylic acid/polyalcohol grafted copolymers, polyacrylate homopolymers, polyacrylate/polyalcohol copolymers, polyacrylate/polyacrylamide terpolyners and polyacrylate, acrylamide, and cross-linked polyacrylic acid.

21. The method of claim 14 which further comprises selecting, as said barrier material, a water-swellable colloidal clay mineral selected from the group consisting of attapulgite, brucite, chlorite, gibbsite, halloysite, illite, kaolinite, montmorillonite and vermiculite.

22. The method of claim 21 which further comprises selecting bentonite as said water-swellable colloidal clay.

* * * * *